Patented May 9, 1933

1,907,796

UNITED STATES PATENT OFFICE

ROBERT A. HALL, OF MINNEAPOLIS, MINNESOTA, ASSIGNOR OF ONE-HALF TO ROBERT O. REIMERS, OF MINNEAPOLIS, MINNESOTA

WOOD PRESERVING AND FINISHING PREPARATION AND PROCESS

No Drawing.  Application filed January 11, 1930. Serial No. 420,283.

This invention relates to a preparation and process for preserving and finishing wood and woodwork.

At the present time, oil of creosote distilled from coal tar, usually between the temperatures of 230° and 270° centigrade is extensively used for treating and preserving wood fiber especially in the case of poles, piles, timbers and other articles of wood, which are exposed to the weather, moisture, insects and other agents of destruction. In some cases, the wood is coated or dipped in the oil of creosote and then subjected to the action of steam under excessive pressure, the action of the steam causing the creosote oil to be driven more effectively into the fiber of the wood. Creosote oil is comparatively free from volatile elements and from viscous substances that clog the pores of the wood and gum the surface but it has not the requisite penetrative qualities for thoroughly impregnating the fiber of the wood and filling the pores. Even where the pressure of steam is used to drive the creosote oil into the pores, "bleeding" or oozing of the creosote oil to the outer surface of the wood is usually prevalent, due to the fact that the oil has not thoroughly penetrated the wood and is not thinned sufficiently to thoroughly penetrate the pores.

Heretofore, to my knowledge, it has been next to impossible to properly finish and fill the interior woodwork which has been treated with creosote oil or other wood preservative material. The exterior surface of the wood would "bleed," would not take the filler and would be greatly discolored by the preservative in the wood.

It is an object of my invention to provide a highly efficient preparation for treating wood to preserve the fiber and finish the exterior surface, bringing out the grain, filling out the interior interstices and leaving the wood in substantially its natural color.

It is a further object to provide a new and improved process for preserving wood fiber and finishing the exterior surface.

Another object is to provide a highly efficient preparation and process for preserving wood fiber wherein the preservative material is caused to thoroughly impregnate and penetrate the pores of the wood and to be held therein, thus obviating the objectionable bleeding and elimination of preservative, prevalent in processes and preparations extensively used at this time.

These and other objects will be apparent from the following description of my preparation and process.

In my process, I utilize as a wood preservative the usual creosote oil distilled from coal tar and of approximately the viscosity extensively used at this time. The creosote oil is first mixed with an ingredient or ingredients of comparatively volatile nature, which will thin the oil and form with the oil a true emulsion and which will have excellent wood penetrating qualities, serving as a vehicle or agent to thoroughly impregnate the fiber of the wood with the preservative ingredients. I have found that alcohol performs this function very efficiently, forms an emulsion with creosote and causes the emulsion to thoroughly fill the cells and interstices of the wood. I prefer to also add to the mixture of creosote oil and alcohol, turpentine, for the purpose of assisting in thinning the oil and in forming the emulsion. The above named ingredients are thoroughly admixed and if I desire to finish and fill the surfaces of the wood, as well as preserve the fiber, the said mixture is then added to another mixture of ingredients which I shall designate as my second mixture.

In the second mixture, wood filler in paste form, white lead, and turpentine are thoroughly mixed together to a creamy consistency and these ingredients when mixed, are found to mix well with the ingredients of my first mixture to form an emulsion which will not settle quickly and which will accomplish the desired results.

To the resultant mixture or emulsion of my first and second mixtures, I prefer to add a relatively small quantity of hydrochloric acid for the purpose of bleaching the preparation and furthermore to assist the ingredients of my second mixture in bringing out the natural grain of the wood and assisting in providing a hard surface finish. The presence of creosote oil in the first mixture has a marked tendency to darken the color of the preparation which, however, is offset to some extent by the presence of the white lead. The addition of the hydrochloric acid produces a preparation of light yellow or cream color and when this preparation is applied to the wood by dipping or painting process, the natural color of the wood will be preserved and the grain will be brought out or accentuated and the outer interstices and grain filled.

While the proportions of the various ingredients may be somewhat varied, to suit certain conditions, the following proportions of parts by volume have been found to produce very successful results.

First mixture:
  Four parts creosote oil
  One part alcohol
  One part turpentine Second mixture:
  Four parts paste wood filler
  Three parts white lead
  One part turpentine The first and second mixtures are mixed together and to the resultant mixture is added:
  One part hydrochloric acid, 32% solution.

The wood is coated with my preparation either by dipping or by painting or spraying the mixture upon the outer surface of the wood. The penetrative qualities of the alcohol in emulsion with the thinned creosote oil acts as an agent or vehicle to carry the preservative deeply into the wood fiber filling all pores. The paste wood filler or white lead will remain for the most part on the exterior surface of the wood and will be evenly distributed thereon. After the wood is coated the surfaces may be wiped or rubbed, removing excess material and leaving a natural wood finish with the grain accentuated and properly filled.

It will be understood that where it is only desirable to preserve the wood, only the first mixture need be utilized, and it moreover has been found that while the addition of the ingredient turpentine to the other ingredients of the first mixture produces beneficial and improved results, that the wood may be properly preserved by means of the mixture or emulsion of creosote oil and alcohol.

Wood treated with my preparation will be preserved indefinitely and the heretofore objectionable "bleeding" will be entirely eliminated due to the fact that the creosote oil is evenly distributed throughout the fiber of the wood by the agency of the alcohol in emulsion therewith. Even with large pieces of lumber the creosote oil is deeply embedded in the wood fiber and consequently will not work to the surface. Cross cuts of pieces of wood treated with my preparation show an even distribution of the preservative into all parts of the wood.

Heretofore, it has been practically impossible to finish and fill the surfaces of wood treated with creosote oil as the oil would work to the surface, forcing out the filler material. Standard filling materials used at this time do not properly combine with the creosote oil to form an emulsion. With my preparation the ingredients of the first and second mixtures are mixed together to form an emulsion. The creosote oil emulsified in the alchol is carried deeply into the wood so that it will not ooze out while the filling ingredients fill the exterior interstices and grain and provide a desirable finish and polish.

What is claimed is:

1. A preparation of the class described, containing creosote oil, alcohol and turpentine in state of emulsion.

2. A preparation of the class described, comprising an emulsion formed of the following ingredients used substantially in the proportion by volume given below, to wit:
  Four parts of creosote oil
  One part alcohol
  One part turpentine 3. A preparation for preserving and finishing wood, comprising creosote oil, alcohol, wood filler in paste form and turpentine.

4. A preparation for preserving and finishing wood, comprising creosote oil, alcohol, wood filler in paste form, turpentine and white lead.

5. A preparation for preserving and finishing wood, comprising the following ingredients used substantially in the proportion by volume given below, to wit:
  Four parts of creosote oil
  One part alcohol
  Two parts turpentine
  Three parts white lead
  Four parts wood filler in paste form 6. The process of preserving wood, which consists in thoroughly mixing creosote oil and alcohol to form an emulsion, and coating a piece of wood with said emulsion to cause the alcohol to penetrate deeply into the wood fiber carrying with it the creosote oil in emulsion and thereby thoroughly impregnating the fiber of the wood.

7. The process of preserving and finishing wood, which consists in thoroughly mixing creosote oil and alcohol to form an emulsion, forming a second mixture, consisting of paste wood filler, white lead and turpentine, uniting said mixtures and thoroughly mixing to form an emulsion, and coating a piece of wood with said resultant emulsion, the alcohol and turpentine thinning the ingredients and acting as penetrating agents to carry the other ingredients deeply into the pores of the wood.

In testimony whereof I affix my signature.

ROBERT A. HALL.